J. ADAMS.
Fruit Jar.

No. 51,785.

Patented Jan. 2, 1866.

Witnesses:
R. T. Campbell
Edw. Schafer

Inventor:
John Adams
by his Attys
Mason Fenwick Lawrence

AM. PHOTO-LITHO.CO. N.Y. (OSBORNE'S PROCESS.)

UNITED STATES PATENT OFFICE.

JOHN ADAMS, OF PITTSBURG, PENNSYLVANIA.

IMPROVED SEALING-RING FOR PRESERVE-JARS.

Specification forming part of Letters Patent No. 51,785, dated January 2, 1866.

*To all whom it may concern:*

Be it known that I, JOHN ADAMS, of Pittsburg, Allegheny county, State of Pennsylvania, have invented a new and useful Sealing-Ring for Fruit-Jars; and I do hereby declare that the following is a full, clear, and exact description thereof, reference being had to the accompanying drawings, making a part of this specification, in which—

Figure 1:
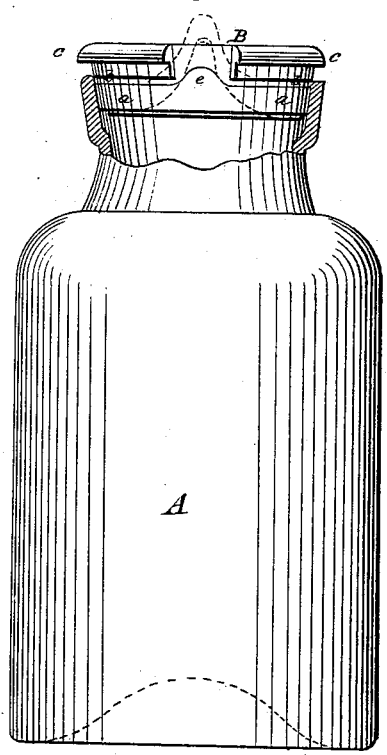
Figure 2:
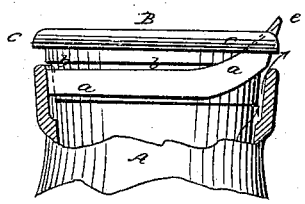
Figure 3:
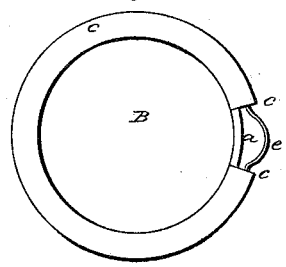
Figure 4:
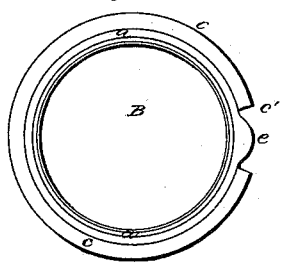
Figure 5:
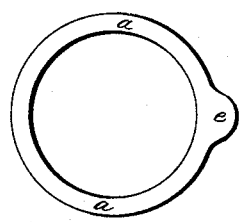

Figure 1 is a side view of a fruit-jar with a portion of its mouth broken away to show my invention applied to the stopper. Fig. 2 is a view showing the mode of allowing the air to enter the jar previously to removing the stopper. Figs. 3 and 4 are views of the stopper of a fruit-jar constructed for receiving the improved packing-ring. Fig. 5 is a view of the improved packing or sealing ring detached from a stopple.

Similar letters of reference indicate corresponding parts in the several figures.

Various methods have been essayed for hermetically sealing the caps or stopples of preserve-jars, so as to effectually exclude air from the fruit contained in the jars; but the most preferable method is to use india-rubber bands around the stopples and to exhaust the air from the jars, so that the outward pressure will confine the stopples in place. The difficulty with this mode, as hitherto practiced, is the removal of the stopples when it is desired to get at the fruit in the jars. This difficulty I remove by the following simple invention:

The mouth of the fruit-jar A may be made of a flaring form, the better to receive a slightly tapering or conical stopple, B, and a packing or sealing ring, $a$, which surrounds the lower part of the stopple, as clearly shown in Figs. 1, 2, and 4.

The stopple B may be made of glass, with a slight shoulder at $b$, and also with a projecting rim, $c$, around its upper end. A notch or space, $c'$, is formed in the side of the stopple for receiving a tongue, $e$, which is formed on the india-rubber ring or band $a$, (shown clearly in Figs. 1 and 5,) which tongue may be made of sufficient length to project above the top of the stopple when the latter is confined in its place within the mouth of the jar. This tongue $e$ should at least project above the upper edge of the mouth of the jar, as shown in Fig. 1, so that it can be caught and held by the fingers when it is desired to remove the stopple.

The jars are filled with fruit and the stopples inserted into their places with the rubber rings between them and the mouths of the jars, after which the air is exhausted from the interior of the jars in any convenient manner, so that the outward pressure of air will force the stopples down firmly in their places, and thus hold them.

When it is desired to remove the stopples it is only necessary to draw out the tongues $e$ of the sealing-rings until a space is left for the admission of air through the slot $c'$ in the stopple into the jar, as shown in Fig. 2, when an equilibrium will be restored and the stopple consequently loosened, so that it can be readily removed.

The rubber rings with the tongues $e$ formed on them might be made to answer without the slots $c'$ in the stopples; but I prefer to use these slots or recesses as the most convenient mode of allowing air to enter the jar when the tongues $e$ are withdrawn.

Having thus described my invention, what I claim as new, and desire to secure by Letters Patent, is—

1. Providing for removing the stopples of preserve-jars which are confined in place by atmospheric pressure by constructing the india-rubber rings $a$, that are interposed between the stopples and the mouths of the jars, with tongues $e$, which are received in slots $c'$, formed in the stopples, substantially as described.

2. Constructing the conical stopples B with slots $c'$, which are adapted to receive tongues on the sealing-rings, substantially as described.

3. An elastic sealing-ring for preserve-jars which has a tongue, $e$, formed on it, as a new and improved article of manufacture.

JOHN ADAMS.

Witnesses:
 JAMES SALISBURY,
 T. B. ATTERBURY.